United States Patent [19]

Brill-Edwards

[11] 4,284,065

[45] Aug. 18, 1981

[54] STATIC SOLAR HEAT COLLECTORS

[75] Inventor: Kenneth O. P. Brill-Edwards, Swansea, Wales

[73] Assignee: Crescent Roofing Company Limited, Swansea, Wales

[21] Appl. No.: 919,956

[22] Filed: Jun. 28, 1978

[51] Int. Cl.³ .............................................. F24J 3/02
[52] U.S. Cl. .................................. 126/432; 126/450; 126/444; 126/DIG. 2
[58] Field of Search ............... 126/432, 450, 903, 444, 126/442, 448, 449

[56] References Cited

U.S. PATENT DOCUMENTS

| | | | |
|---|---|---|---|
| 4,089,324 | 5/1978 | Tjaden | 126/444 |
| 4,111,188 | 9/1978 | Murphy | 126/DIG. 2 |
| 4,114,597 | 9/1978 | Erb | 126/448 |
| 4,123,003 | 10/1978 | Winston | 126/444 |
| 4,244,353 | 1/1981 | Straza | 126/448 |

FOREIGN PATENT DOCUMENTS 2529095  1/1977  Fed. Rep. of Germany ........... 126/442

*Primary Examiner*—Carroll B. Dority, Jr.
*Attorney, Agent, or Firm*—Alan K. Roberts

[57] ABSTRACT

A load-bearing building panel capable of forming an external wall cladding or roof component has a solar heat collecting capacity in the form of channels for heat exchange fluid incorporated in the fabric of the panel. The panel is made of a structural plastics material, such as G.R.P. laminate, successive layers being moulded to simulate tiles. On the back or underside, longitudinal reinforcing beams are built in during laying up of the panel. Between the beams cores or formers defining a matrix or channels are encapsulated in layers of the G.R.P. Wax cores are melted or dissolved out after curing of the panel; metal formers remain embedded in the fabric of the panel. The matrix is connected by flow and return pipes to a heat exchange system within the building. Panels intended for roofing have ridge flanges and wall plates moulded into the substrate at the appropriate pitch angle, and a split capping tube embraces the ridge flanges. A pitched roof formed by oppositely sloping panels is self-supporting. An integral box girder can also be formed across the underside of the panel at the eaves to rest on the top of the external wall to be loaded with concrete in situ so as to anchor the roof on the walls.

13 Claims, 17 Drawing Figures

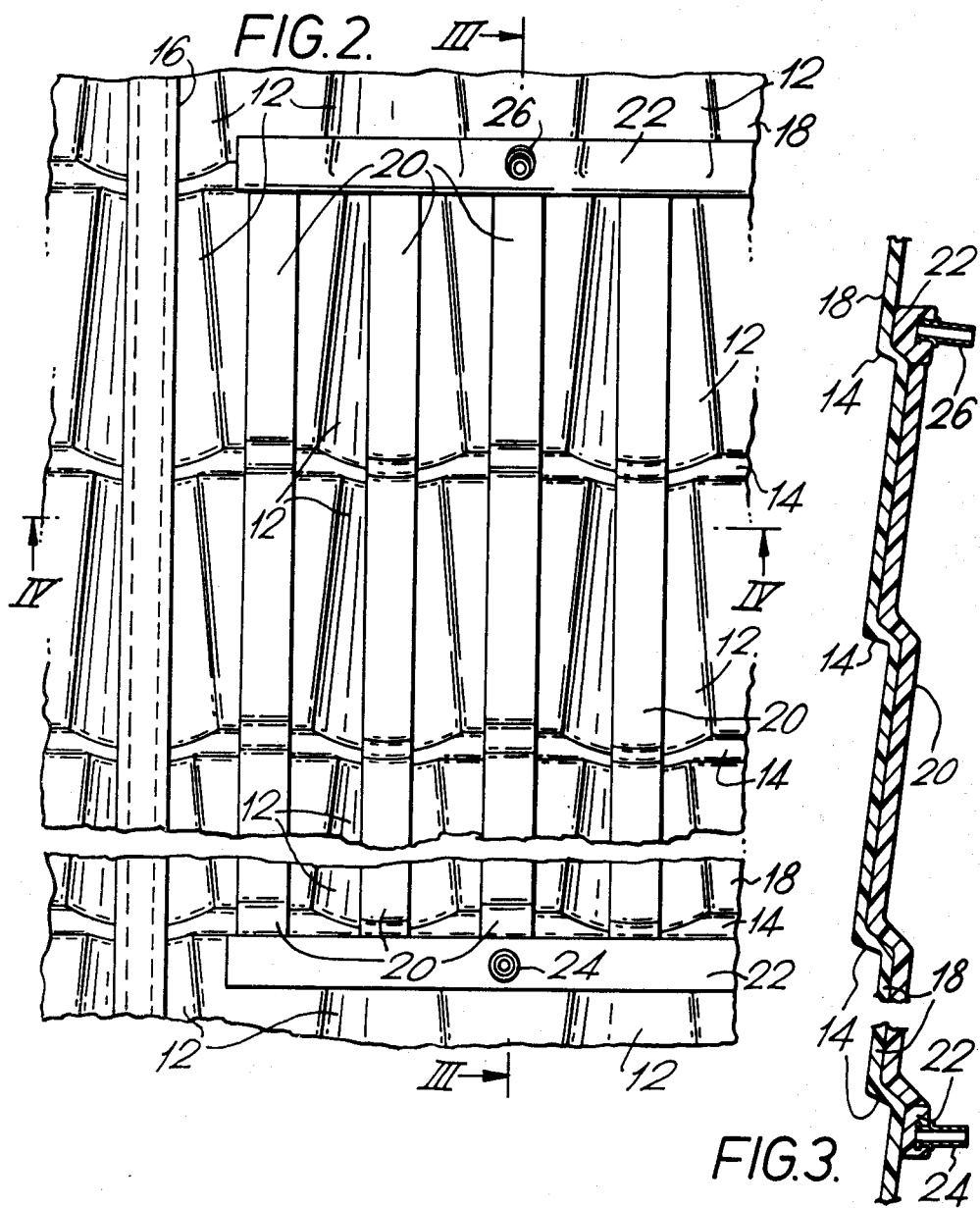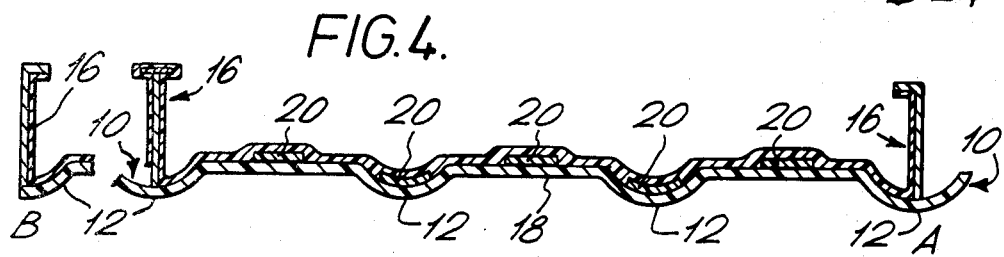

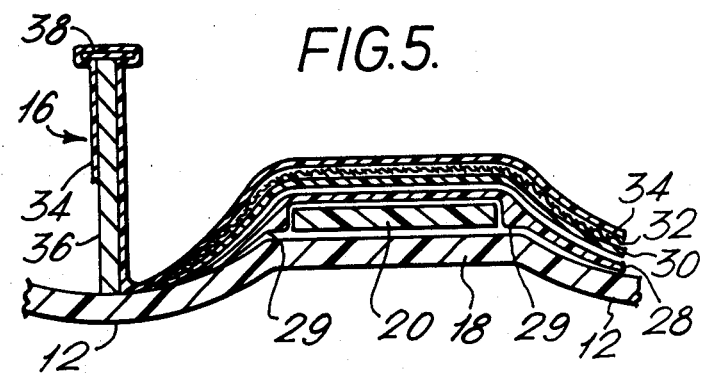
FIG.5.
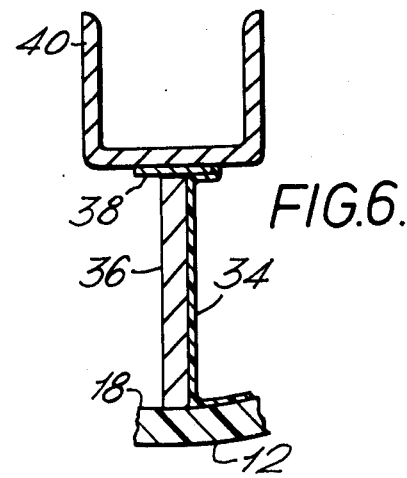
FIG.6.
FIG.7.
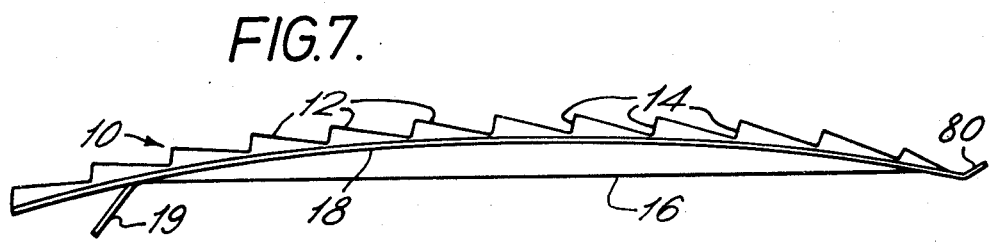

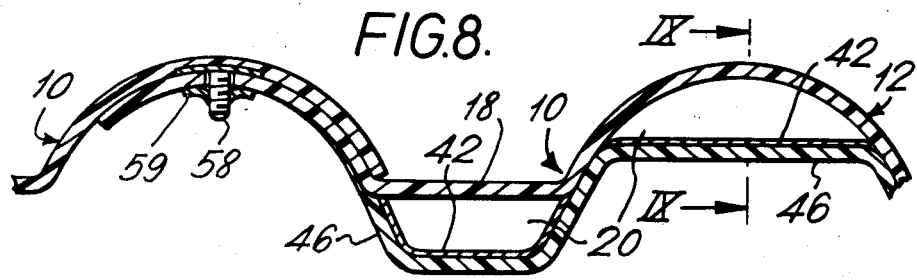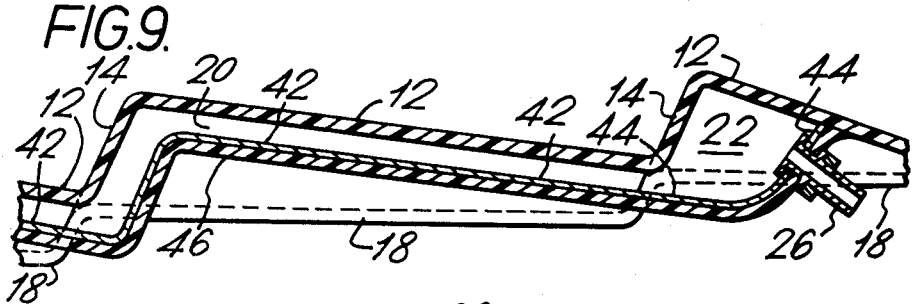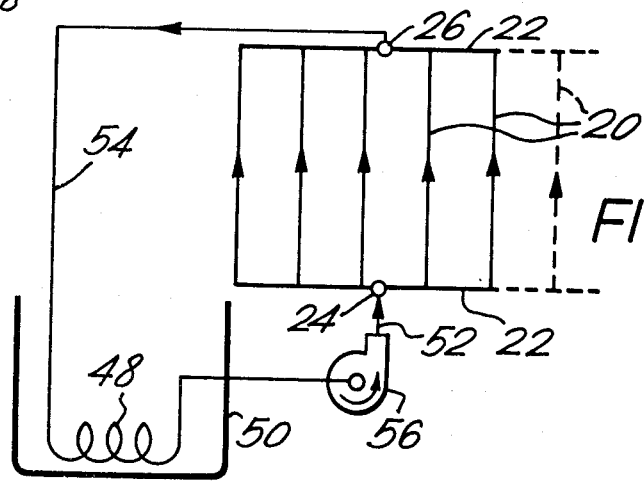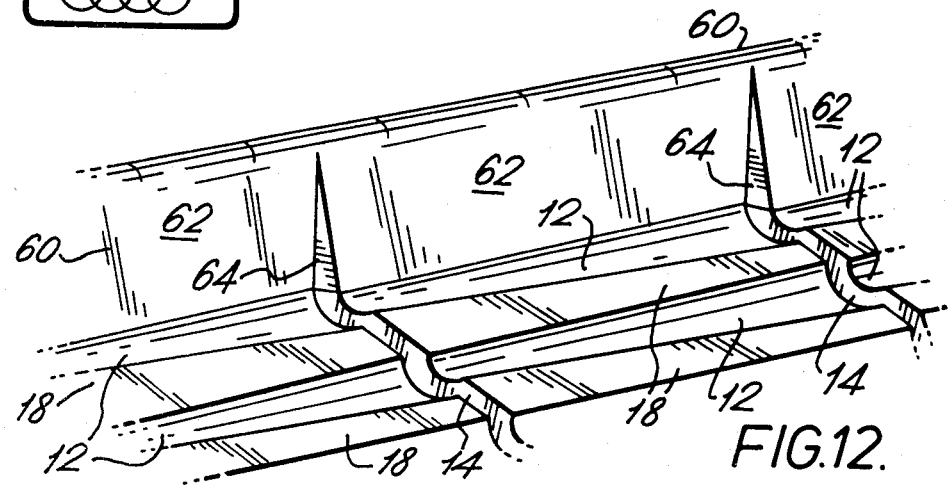

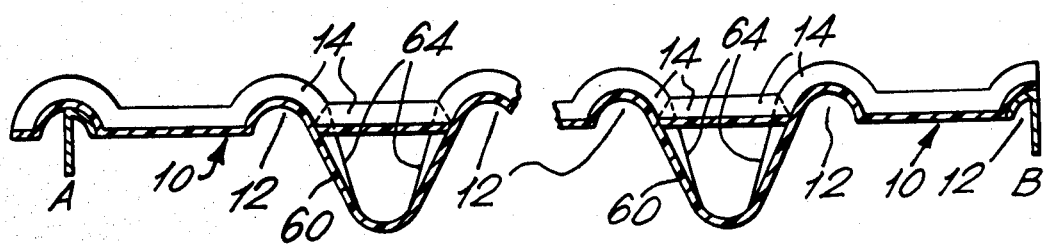
FIG. 11.
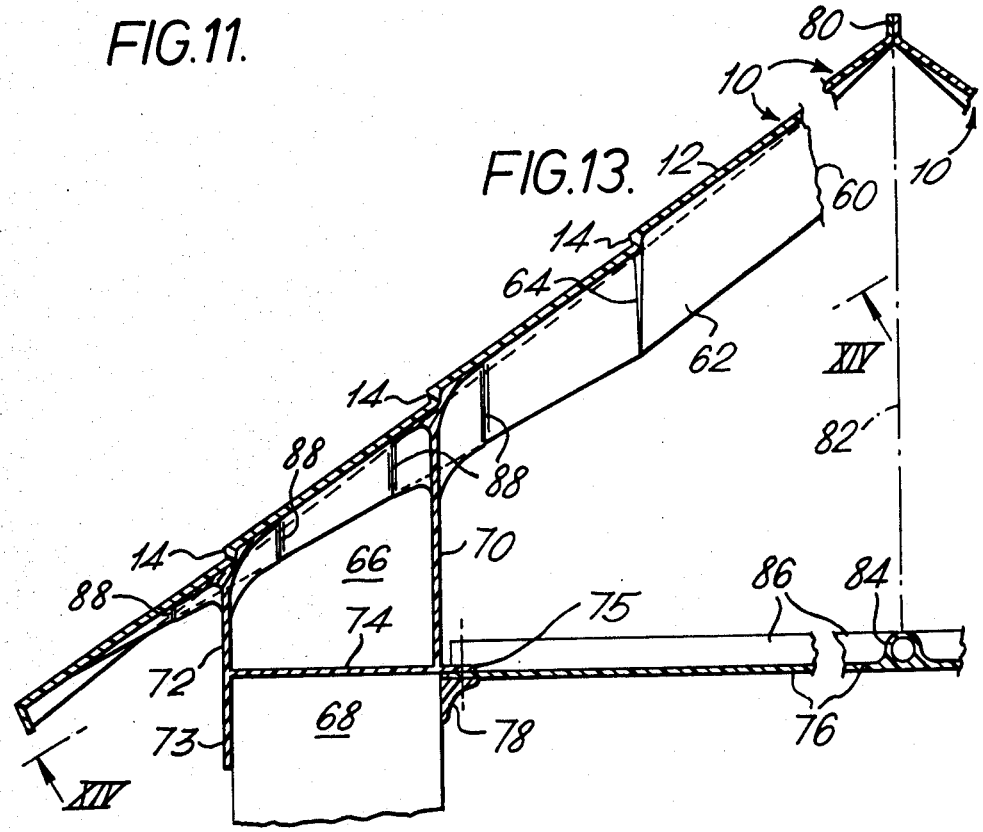
FIG. 13.
FIG. 14.
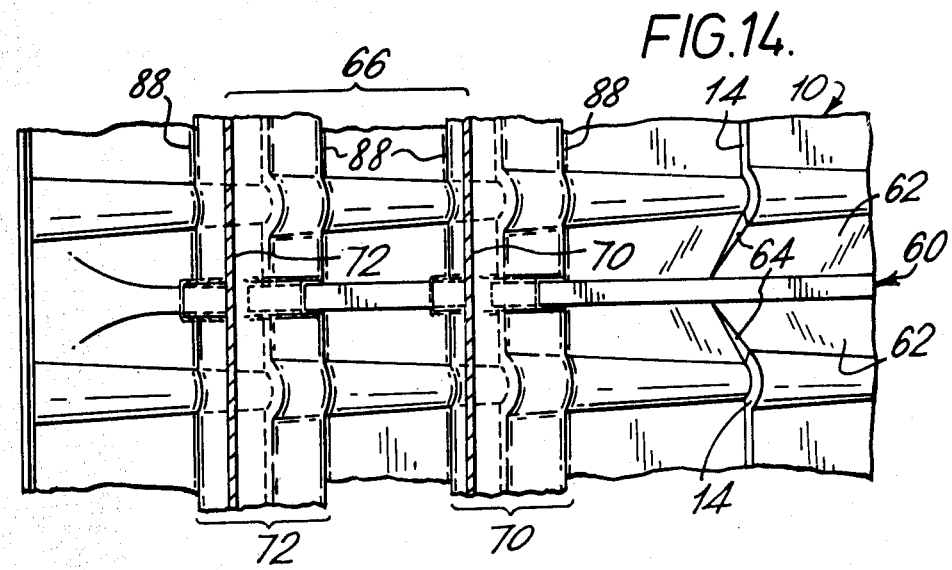

STATIC SOLAR HEAT COLLECTORS

FIELD OF THE INVENTION

This invention relates to static solar energy collectors which consist of panels for exposure to solar and other cosmic radiation combined with heat exchange means such as a fluid circulatory system in heat-conducting contact with the exposed surface.

Most static heat collector panels as hitherto constructed have been designed to be either free-standing or to be mounted on an existing structural surface such as a wall or roof as an extra layer thereon. The heat exchange fluid system must then be plumbed to the point of use of the heated fluid, and if this is within the building the walls or roof skin thereof must be pierced by flow and return pipes, which involves sealing problems at the points of penetration, and sometimes extended or circuitous piping. There are also problems of maintenance and repair of the overlaid zone of the roof or wall.

PURPOSE OF THE INVENTION

It is an object of the present invention to provide a construction of panel which combines a facility for solar heat exchange with the requisite physical and mechanical properties of a structural building component, thus providing a dual-purpose building panel which can be used as the exterior cladding or skin of a wall or single span roof unit. As a building panel, the unit must be sufficiently rigid to be at least self-supporting between adjacent fixing points which, in the case of a roof panel of a domestic dwelling, may be at the eaves and the ridge.

Another object of the present invention is to provide a simple and efficient design of panel which requires a minimum of mechanical support, especially when used as a roofing element, and which can be assembled into larger units, such as complete roofs, with relative ease by semi-skilled labour before being mounted as a complete unit in position on a building. With particular reference to roofing panels, it is an object of the invention to enable a complete roof to be assembled from prefabricated panels at ground level and then be lifted into place on the tops of the walls of a building.

A further object of the invention is to form a panel of a structural plastics material with an integral channel or matrix of interconnected channels for the flow of heat exchange fluid.

A still further object is to provide a method of forming the integral channel or channels within the fabric of the panel.

SUMMARY OF THE INVENTION

With these and other objects in view the present invention provides a solar energy collector panel consisting of a longitudinally corrugated building panel of a structural plastics material having a series of preferably uniformly spaced tranverse ridges or steps at least on its front or upper side to simulate rows of overlapping tiles, and an integrally formed longitudinal stiffener on the back or under side. This panel is built up from laminae of the structural plastics material bonded together and moulded to the required shape, two successive laminae being separated over a specific zone to form the channel or channels through which heat exchange fluid is to be circulated, while inlet and outlet fluid circuit connections are embedded in the outer lamina or laminae for connecting the channel or channels to an external flow circuit.

A structural plastics material is defined, for the purposes of this specification, as one which withstands the normal changes in temperature, humidity, wind and other external loadings without permanent sag or dimensional distortion; resists degradation from exposure to ultraviolet light; is suitably fire-resistant in accordance with fire regulations; and is substantially non-toxic when subjected in situ to abnormal temperatures.

A convenient material for the building panel is a glass-fibre reinforced plastics material (G.R.P.); and this may be "doped" or loaded with one or more substances for promoting heat transmission across the thickness of the panel. Such substances include, for example, a powdered or granular metal such as aluminium; glass beads of a size between about 4 and 40 microns, or other additives. Only the zone of the or each channel or duct need be so doped or loaded, and the glass beads can if desired replace some of the conventional glass fibres in the material.

The fluid circulated through the channels and ducts in the building panel is preferably passed through a heat-exchanger within the building, the heat exchanger being adapted to heat, say, a reservoir of water. The heat exchange fluid preferably has a high heat absorption characteristic. The complete solar heat storage system comprises a solar panel according to the present invention; a reservoir for a fluid to be heated; and a heat exchanger.

The invention also includes a self-supporting roof panel designed to span a roof pitch from eaves to ridge, the ridge end of the panel having an upturned flange angled to the general plane of the panel so as to be secured to the corresponding flange on a similar panel on the opposite roof pitch, while an integral depending flange near the eaves end of the panel is designed to be fixed to an external wall of the building.

DESCRIPTION OF PRACTICAL EMBODIMENTS

Practical embodiments of the present invention will now be described, by way of illustration only, with reference to the accompanying drawings in which:

FIG. 2 is a fragmentary underplan view of FIG. 1 to a larger scale;

FIG. 3 is a section (omitting covering material) on the line III—III of FIG. 2;

FIG. 4 is a section on the line IV—IV of FIG. 2;

FIG. 5 is an enlarged and exploded view of part of FIG. 4 showing stages in the process of manufacture;

FIG. 6 is a detail of an integral reinforcing beam at an early stage in its construction;

FIG. 7 is a side elevation, on a smaller scale, on the arrow VII of FIG. 1 illustrating a hogged panel as preferred for the longer spans;

FIG. 8 is an enlarged scrap view on the same section as FIG. 4 illustrating an alternative way of forming channels within the fabric of a panel and an alternative method of joining laterally adjacent panels;

FIG. 9 is a section on the line IX—IX of FIG. 8;

FIG. 10 is a circuit diagram of a heat exchange fluid circulating system;

FIG. 11 is a section, partly broken away, on the line XI—XI of FIG. 1 drawn to a larger scale and illustrating an alternative form of reinforcing beam to that shown in FIGS. 2-6;

FIG. 12 is a scrap perspective view of the modified form of the reinforcing beam shown in FIG. 11;

FIG. 13 is a vertical section, partly broken away, through a roof showing an alternative way of locating the roof panels on the external walls and also illustrating a ceiling construction;

FIG. 14 is a scrap underplan view on the line XIV—XIV of FIG. 13;

Figure 1:
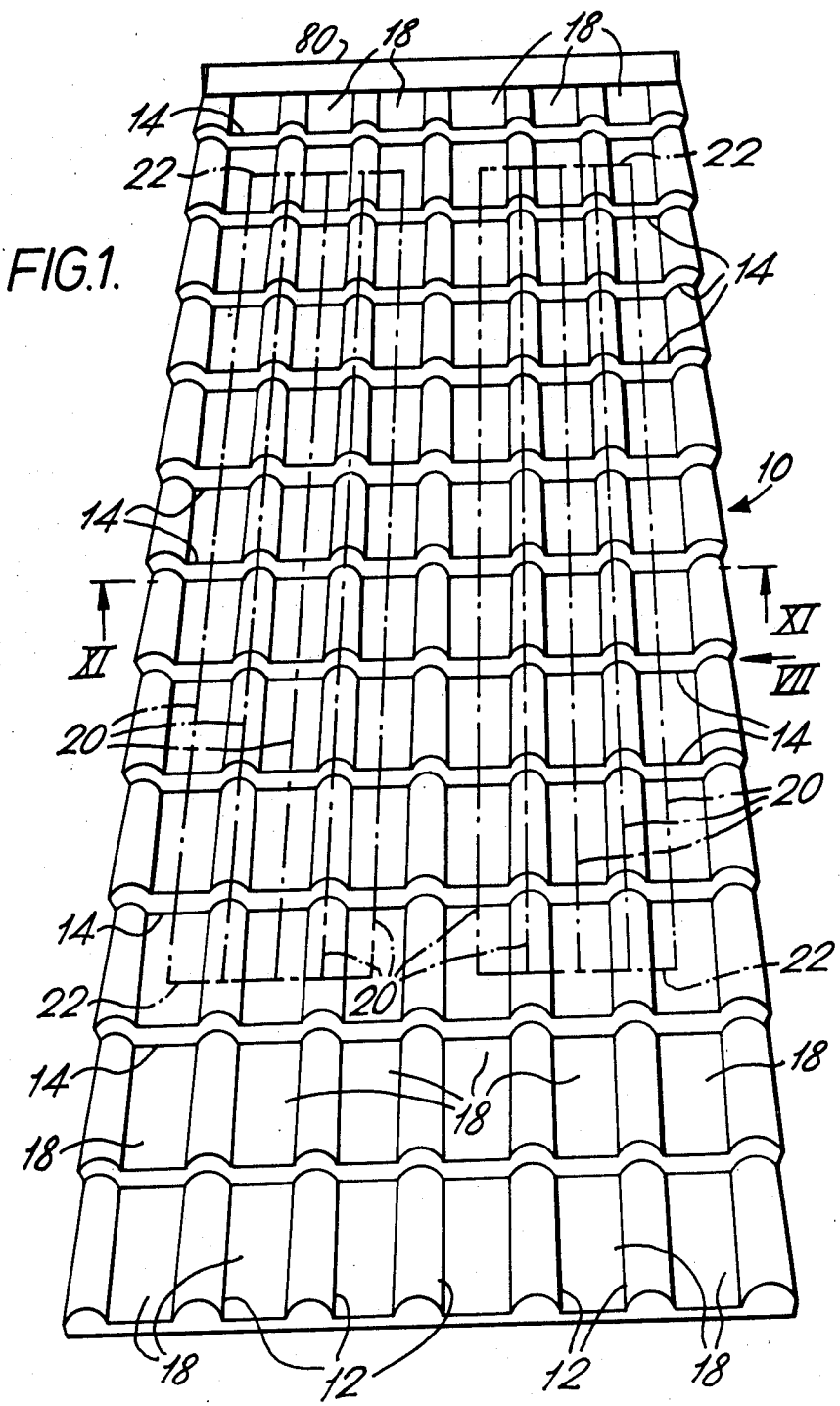
FIG. 1 is a general perspective view of a solar roof panel.

Referring first to FIGS. 1-7, a roof is made up of a plurality of basically similar panels 10 each having longitudinal corrugations 12 of roughly semi-circular shape divided into equal frusto-conical sections which meet end-to-end at regularly spaced transverse walls or steps 14. The substrate of the panel, as represented by the valleys 18 between adjacent corrugations 12, is planar. Each transverse row of corrugation sections 12 between successive steps 14 simulates a row of roof tiles, and each step 14 simulates the overlap between rows. As shown in FIG. 4, each panel 10 is reinforced longitudinally on its underside by three integral beams 16, one central and one each along each longer side. Each side beam 16 is mounted at the crest of a marginal corrugation 12, one of which, marked A in FIG. 4, is a full corrugation while the other, marked B in FIG. 4, is a half-corrugation. This pattern allows the half-corrugation B to nest under a counterpart full corrugation A on a laterally adjacent panel and thus allow the respective side beams 16 to abut and be bolted or otherwise secured together. The free edge of each beam 16 may be straight while the main substrate 18 in which the longitudinal corrugations 12 and transverse steps 14 are formed is hogged or outwardly convex (FIG. 7). This configuration of a building panel affords a high load-bearing capacity, but is not essential, and a flat substrate 18 can be reinforced by beams 16 each having its free edge convex to the substrate 18.

The panel 10 is first formed by laying up a number of laminae of G.R.P. on a mould contoured to form the pattern shown in FIG. 1. When the appropriate thickness of substrate has has been laid up in the mould, and the resin has set to a soft gel ("green" stage) the core of a heat-exchange fluid matrix is assembled on the substrate. The matrix conveniently consists of five channel and two header strips or fillets of a hard-setting wax such as Okerin 4140 made and sold by Astor Chemical Co. Ltd. or like substance which can readily be softened and melted under heat. In FIG. 1, two matrices are indicated by channel and header center-lines 20, 22. First, longitudinal fillets 20, measuring approximately 2½ inch by 5/32 inch in cross-section, are placed where channels are to be formed in the thickness of the eventual panel. A fillet 20 is laid along the (inverted) bottom of each of two corrugations 12 and along the flat zones between corrugations 12 for the greater part of the distance between eaves and roof ridge. In order to ensure that each fillet 20 snugly conforms to the contour of the exposed surface of the substrate 18 and excludes all air pockets, the fillets are first softened to a plastic state (at 50° for Okerin 4140) so that they can be pressed into contact with the substrate throughout their lengths. When each fillet 20 has thus been laid in position all their top ends are checked for transverse alignment, and similarly all their bottom ends—"top" and "bottom" being related to the attitude of the panel when erected on a wall surface or roof pitch.

After the accurate transverse alignment of the top and bottom ends of the longitudinal fillets 20, shorter and usually thicker core components 22 of the same hard wax or like material are moulded transversely onto the substrate to bridge the ends of the longitudinal fillets 20 and are firmly united with each other. These transverse fillets 22 define cross-ducts in the finished panel which will form top and bottom headers of the heat exchange fluid matrix. While the wax or other material of the complete core 20, 22 is still soft, inlet and outlet pipe connectors 24, 26 respectively (FIG. 3) are pressed at their correct final positions into the respective headers 22. The core is now allowed to harden. If Okerin 4140 is used, this will be 10 min. at 22° C.

Referring particularly to FIG. 5, after the core has hardened, a "gel coat" 28 of a thixotropic resin is applied over the surface immediately surrounding and embraced by the core assembly, special attention being paid to the filling in of sharp corners or pockets (such as at 29) where parts of the core meet the substrate 18 or each other so as both to exclude air from these pockets and to present a smooth surface to the next layer. When the gel coat 28 has gelled (i.e. reached a soft rubbery consistency) a coat 30 of laminating resin is applied over it and covered with a glass fibre tissue 32, or layer of similar reinforcement cloth, which is pressed into the wet resin. The resin coat 30 is in turn allowed to gel. At that stage, another lamina 34, identical to those laid up to form the substrate 18, is laid over the entire exposed under-surface of the panel 10, and care is exercised to ensure that the external circuit connectors 24, 26 are thoroughly and firmly embraced by laminate. The latter is allowed to gel.

When the laminate 34 has gelled it can either be allowed to cure or a further coat (not shown in FIG. 5) of pure resin can be applied so as to add a further safeguard against "pinholing" of the composite coating overlying the core.

Whichever option is exercised, the completed panel is stripped from the mould when the last coat or layer has gelled and is allowed to cure at a temperature of 65°-70° for 24 hours. At the end of the curing period, the external circuit connectors 24, 26 are cleared of all embedded wax and the panel is placed in a dewaxing chamber at an angle of 20°-30° to the horizontal. A drip tray or trough is placed beneath the outlet connector 26 and the core 20, 22 is either melted out or dissolved out, recovered and recycled. Finally, the heat exchange fluid matrix is scoured by a dewaxing agent at about 90° C. The panel is now ready for use both as a structural component and as a solar heat collector with heat exchange fluid channels incorporated in its fabric.

In FIG. 4, the several layers 28 ... 34 are shown encapsulating the matrix core 20, 22. The final glass-fibre lamina 34 is extended beyond the zone occupied by the matrix core and is laid up over the adjacent faces of the central and edge beams 16 to bond each more firmly to the substrate 18. Each of the beams 16 is conveniently formed by cutting one or more sheets of hardboard, plywood, metal or the like to a segment of a circle and placing it or them upright on one or other edge along a corrugation 12 to form a web as shown at 36 in FIG. 6. If the hardboard or other sheets are placed with the straight edge down, then the substrate 18 of the panel 10 lies flat when erected, and the free edges of the beams 16 are convex.

Assuming that the beams 16 are arranged so that the panel 10 is hogged, a tension strap 38 is stretched over the web 36 of the beam 16 and "tacked" in place by a coating of resin. A straight rigid rule or bolster 40 is pressed on top of the strap 38 until this coating has set to hold it symmetrically to the web 16 while tension is applied and the ends of the strap are locked into the underface of the substrate 18. A layer of laminate can be laid over the strap 38 to bond to the laminate layer 34 and make the entire undersurface of the panel homogeneous.

The underside of the panel 10 is thus divided by the beams 16 into two longitudinal zones of roughly equal area, and it is preferred to apply a heat exchange matrix 20, 22 to each zone in order to equalise as far as possible the temperature distribution over the whole area of the panel, thus tending to minimise local temperature stresses in the panel.

In an alternative method of forming integral heat-exchange fluid channels in a panel 10, as illustrated in FIGS. 8 and 9 each channel 20 is defined by a former 42 of light alloy or like fluid-impervious material, and each header 22 is defined by a former 44 of similar material, the formers 42, 44 being shaped and dimensioned so as to fit snugly together. The whole matrix of channel and header formers is then overlaid by a composite layer 46 of gel coats and laminae similar to those described above with reference to FIG. 5. The layer 46 serves both to lock the matrix of formers 42, 44 together and to the panel 10, and to seal the fluid circuit against leakage.

A further alternative method (not illustrated) of forming a matrix of heat exchange fluid channels utilises the vacuum forming process. Uncontoured G.R.P. sheet is bonded to a conventional vacuum forming plastics sheet—such as A.B.S.—and is vacuum formed to the required profile without the matrix. A second sheet of vacuum forming plastics sheet—such as A.B.S.—is vacuum formed to the required contour including the matrix. The two vacuum formed products are then bonded together so as to present the matrix as a precisely contoured gap or clearance between layers or plies of the fabric of the panel. The process can be substantially continuous and automated so that the composite G.R.P. and plastics (A.B.S. or the like) sheet is continuously delivered to its vacuum forming dies at the same time as the second sheet of vacuum forming plastics is also being continuously delivered to the matrix-forming die. The completed panel thus constitutes a laminated product in which a precisely controlled separation between adjacent laminae provides a matrix of channels for the flow of heat exchange fluid within the fabric of the panel.

FIG. 10 illustrates a typical heat exchange fluid circuit. A group of five ducts 20 are shown connected in parallel by headers 22, and these latter may be extended from one panel 10 to the next, or from one side of a reinforcing beam 16 to the other, to inter-connect a plurality of groups of channels 20, as indicated in dotted lines. A heat exchanger coil 48 immersed in a tank 50 connected by flow and return pipes 52, 54 respectively to the headers 22, the flow pipe 52 including a circulating pump 56 to feed heat exchange fluid up into the bottom header 22.

FIGS. 11–14 illustrate a modified construction of stiffening or reinforcing beam 60. This consists essentially of an integrally moulded hollow Vee-shaped rib whose height varies from a maximum at mid-span to zero at each end. Each beam 60 straddles a valley or flat zone 18 between adjacent corrugations 12 and is separately moulded before being placed in position on the partially completed panel at, say, the stage where the matrix cores 20, 22 or formers 42, 44 are ready to be encapsulated by the layers 28 . . . 34 (FIG. 5). These layers are then extended to embrace the beam 60.

The root of each flank 62 of a beam 60 follows the line of each successive corrugation 12 from one end to the other. Thus, at each step 14, there is a gusset in each flank 62 which is offset at an angle to the flank and forms a tapering buttress wall 64 which vanishes as it approaches the crest of the beam 60. This offset or buttress formation 64 increases the resistance of the beam 60 to buckling under load and improves the strength/weight ratio of the panel as a whole. The hollow interior of the beam may if desired be filled with a rigid foamed plastic to add strength.

The integration of the beam structure 60 with the panel is preferably supplemented by the application of a tensioning strap (not shown) which extends along the crest of the beam 60 and is tensioned with a load of about 200 lb. during the application of the layers 28 . . . 34 (FIG. 5). When these layers have set, the projecting ends or "tails" of the tension strap are anchored to the substrate of the panel by an overlay of laminate in any conventional way. For example, the tails may be split axially and each half may be bent back to lie alongside the root of the beam while being embedded in the overlaid laminate so as to lock the strap. When an external load is applied to the panel 10, the crest of the beam 60 is placed in tension while the flanks 62 are placed in compression normal to the plane of the substrate. The tensioning strap takes much of the tensile load and the buttress wall 64 stiffen the flanks 62.

Also shown in FIGS. 13 and 14 is an integral hollow box girder 66 which spans the width of a panel 10 where it meets the external wall 68 of the building. The girder has inner and outer flank walls 70, 72 and a bottom wall 74, the latter being adapted to rest on the top of the outside wall 68 of the building. The box girder 66 on each panel 10 registers end-to-end with its counterpart on each adjacent panel to form a continuous formation. The outer flank wall 72 of the girder is extended downwards in a flange 73 which performs both a mechanical locating and a weather sealing function, the complete roof structure being registered on the outside walls of the building by means of the flanges 73, and these are deep enough to provide draught and water seals, aided if necessary by a suitable mastic sealant. The bottom wall 74 is also extended inwards to provide a ledge 75 for fixing a ceiling structure 76. The latter is held up against the underside of the ledge by any convenient fixing means such as bolts or rivets which can be masked from below by a ceiling moulding or coving 78.

The ceiling structure 76 acts normally as a tie when the roof is in place on the building, but if the entire roof is assembled on the ground and then hoist as a unit on top of the walls, the ceiling structure 76 acts as a strut to keep the roof spread at the correct pitch. The ceiling structure is stabilised during the handling of the entire roof by a tensile stay or stays 82 from the ridge 80 to the centreline of the ceiling 76 where a stiffening rib 84 adds rigidity in conjunction with one or more transverse stiffening ribs 86.

To make the box girder 66, a single ply or lamina of the structural plastics material used for the panel 10 is first laid up on a former. It is then located in position on the panel and the requisite number of additional plies or laminae are laid up thereon, each one being suitably faired into the contours of the panel over a sufficient surface to provide the requisite strength of bond between the panel 10 and the girder 66, as indicated by the boundary lines 88 in FIGS. 13 and 14. A suitable filling aperture (not shown) is made through the inner wall 70 and near the top thereof between beams 60 for the pumping of concrete into the box girder 66 after mounting the roof structure on top of the walls 68 of the building. Since the girders 66 on adjacent panels 10 register, a continuous concrete lintel is thus formed along the eaves on each side of the roof, and provision may be made for registration of the box girder formation with corresponding formations on gable end panels (not shown) to make a continuous lintel all around the tops of the outside walls 68 of the building. The volumetric capacity of the box girder 66 is calculated so that, for given wind conditions on site, a roof can be anchored to the building by the weight of concrete without the necessity for bolts through the flanges 73 into the walls 68.

When this type of construction is adopted—or even when no box girder 66 is used—it is preferred to avoid the jointing of laterally adjacent panels 10 by means of depending flanges along each longitudinal margin as illustrated at A and B in FIG. 4 or FIG. 11 so as to avoid obstruction of the space within the girder. The method of fixing illustrated in FIG. 8 can then be substituted whereby the overlapping corrugations at A have a series of proprietary plate-headed bolts 58 embedded at regular intervals along their crests on the underside. These bolts are passed through registering holes in the crests of the underlapping corrugations at B along the opposite margin of the adjacent panel 10. When correctly assembled, the joint is completed by a nut 59 on each bolt 58 which is preferably of the quick-action press-on type, and preferably also profiled so as to be a snug fit against the concave surface of the underside of a corrugation. Conventional threaded nuts may, of course, be used if preferred provided that the appropriate precautions are taken to prevent damage to the material of the corrugation as the nut is tightened.

The efficiency of the above flangeless joint will be partly dependent on the number and spacing of the bolts 58 and the security of engagement of quick-action nuts or equivalent fasteners where these are used.

Figure 15:
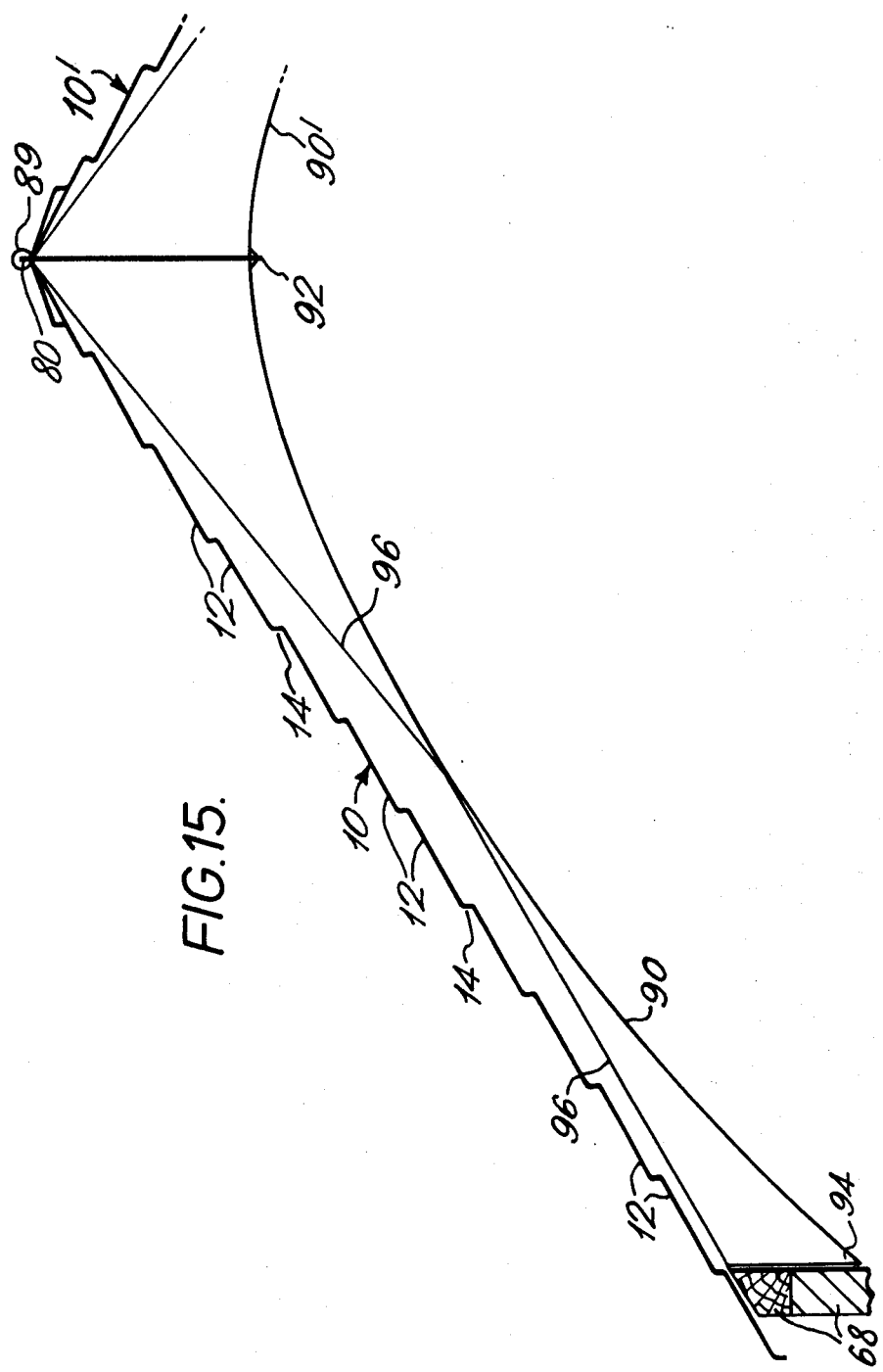
FIG. 15 is a schematic view of a still further form of reinforcing beam which can support a vaulted ceiling.

FIG. 15 illustrates an alternative pattern of reinforcing beam 90. The contour of this beam is concave downwards or rearwards, and the ends 92, 94 are chamfered to mate respectively with a counterpart beam 90' on the panel 10' on the opposite side of the ridge 80, and with the internal surface of the wall 68. The panel 10 may be further braced by a wire or like tensile element 96 which is secured to the panel 10 at each end and to the crest of the beam 90 at mid-span. Preferably, the beam 90 is moulded in the same way as the beam 60 and is similarly integrated with the panel. It is also preferably made in the form of a hollow V-section casing the interior of which is subsequently filled with a rigid foamed plastics substance. The concave contour of the beams 90, 90' facilitates the attachment of an internal skin (not shown) to give a vaulted enclosed roof space.

Figure 16:
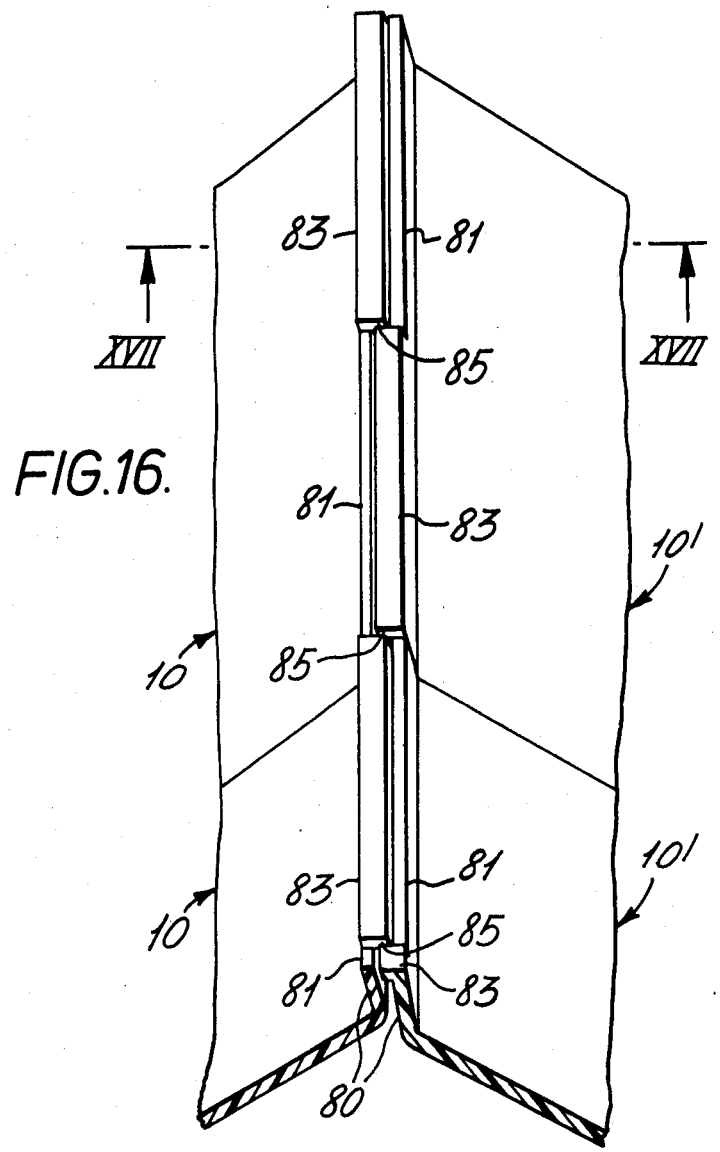
FIG. 16 is a schematic perspective view from above of part of a roof ridge immediately prior to the making of the joint between meeting roof panels on opposite pitches or flanks of the roof.
Figure 17:
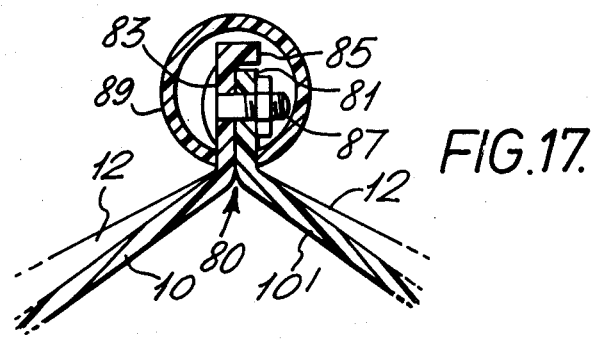
FIG. 17 is a section on the line XVII—XVII of FIG. 16 showing the joint completed.

FIGS. 16 and 17 show a preferred method of securing together the ridge flanges 80 of meeting panels on opposite roof flanks or pitches. Each flange 80 is in two parts 81, 83 of equal length. The part 81 is a plain flat rib but the part 83 has a short lateral lip or "nose" 85 of a width to overlie the complementary plain part 81 of a mating panel on the other roof flank or pitch. The two flanges 80 are bolted or riveted together at 87 (FIG. 17) and a G.R.P. split-tube capping 89 is introduced over the joint to seal it. The threaded ends of the bolts 87 preferably project alternately from opposite faces of the united flanges to engage the split tube 89. Not only does the capping tube 89 provide an aesthetically acceptable finish to the ridge of a roof but also it performs both a primary sealing function to resist ingress of water past the joined flanges 80 and a mechanical function as an abutment for engagement by a clamp on a hoist cable. Tests were carried out on a full-size pitched roof measuring 11 ft. 9 in. eaves to ridge × 17 ft. 10 in. span between wall plates and a ridge length of 32 ft. It weighed approximately 9½ cwt. Lightweight battens kept the panels spread at the proper span. The roof was hoist clear of the ground by means of four clamps on the capping tube 89 and was held suspended. Consequently, it becomes eminently feasible to construct the entire roof of a dwelling at ground level from prefabricated panels 10 and then hoist it in position on the tops of the walls, leaving only the operations of securing it to the walls and completing the heat exchange fluid circuit connections to be carried out in situ on the building. This means that any tests for strength of joints, effectiveness of seals, freedom of flow through the heat exchange matrices, and so on can be carried out, and faults rectified, at ground level.

The invention thus provides a dual-purpose building panel which can be used as the sole load-bearing component of a building at its designed location whilst at the same time providing within its fabric an effective solar heat exchange facility. For example, a panel made in accordance with the process described above can be used by itself to span the pitch of a roof between eaves and ridge on a conventional surburban house without additional support from below other than the walls of the building. At the same time, the panel 10 has the in-built facility for collecting heat from the rays of the sun and transferring it to a hot water storage cylinder or tank without significantly increasing the weight of the roof panel as such as necessitating the extra complication of making fixings and passing flow and return pipes through the external skin of the roof. Similar advantages apply if the situation concerned is a wall instead of a roof.

In use as a solar heat collector, it is preferred to use an oil in the matrix for absorbing the radiant heat and to circulate this round a closed circuit which includes a heat-exchanger coil or equivalent in a tank or cylinder of a hot water system. Oil has a higher heat capacity than water and can attain a higher temperature in the matrix for a given radiation dosage. It will, however, be understood that the precise mode of application of the invention is optional according to local conditions and requirements.

A building panel constructed according to the present invention can have the area or areas to be exposed to absorption of solar heat "doped" or loaded by the addition to the mix for the substrate laminae of one or more substances for promoting heat transmission across the thickness of a lamina, such substances including powdered or granular metal such as aluminium, or glass beads of between 4 and 40 microns. The approximate thickness of the substrate 18 in which such "doping" or additive is used is of the order of ⅛ inch.

THERMAL PERFORMANCE TESTS

A building panel according to FIGS. 1-7, but having two Vee-section reinforcing beams as illustrated at 60 in FIGS. 11 and 12 in place of the three flat beams 16 of FIGS. 1-7 and made from chopped strand glass fibre mat and a resin/glass ratio of 2½:1, was tested under practical conditions of very low wind speeds over several days in August in Swansea, W. Glamorgan, Wales. The test panel was set at an angle of 35° throughout the tests, and water was used as the heat exchange fluid. The underside of the panel between the reinforcing beams 60 was insulated by a mat of glass fibre wool 7.5 cm. thick to prevent heat loss from the water.

Table I records the results of tests to establish optimum flow conditions, and table II records the results of tests to establish the heat accumulation performance under different panel orientations and with different masses of water in the storage tank.

From table I it will be seen that the heat collection efficiency is dependent on water flow rate, and is a maximum at a flow rate of 0.125 Kg/s. This is the rate adopted for the constant flow rate tests. The time of day recorded in all cases is British Summer Time, and the sun reached its zenith in Swansea in August at approximately 1.15 p.m.

Table II records the heat absorbed by the water in terms of megaJoules accumulated over periods of 1 hour. It should be noted that although the flow rate of the water through the storage tank—0.12 Kg/s—is low, it is relevant to a practical domestic installation in which several panels would normally be connected in parallel. It will be noted that with the smaller volume of storage water there is an energy loss from the water after about 2.30 p.m. This is due to the increase of the storage water temperature over that of the panel surface when the sun's elevation declines. However, when the volume of storage water is doubled, the rate of its temperature rise is lower, and energy loss from the water does not begin until later in the day. Thus, energy collection can continue over a longer period. Furthermore, the surface temperature of the panel is lower due to the cooling effect of the circulating water, so that convection and radiation losses by the panel are reduced.

The tests indicate that a panel according to the present invention operates as an efficient collector of solar radiant energy so long as its surface temperature is kept as low as possible by the circulating heat exchange fluid.

Heat conduction tests carried out on samples of the structural plastics material (G.R.P.) from which the test panels were made showed that the addition of aluminium granules to the mix improves the thermal conductivity by up to 35%, the improvement being greater the larger the size of granule. Such an increase in thermal conductivity is beneficial to the energy collection performance of the panel both by reducing the thermal resistance of the structural plastics material and probably by increasing the collection area.

TABLE I

Effective Absorption Area = 1.553 m²
Panel Orientation South 25° East

| Type of Test | Time | | Flow Rate Kg/s × 10⁻² | Temp. Rise °C. | Energy Collected KW/m² | Solar Radiation KW/m² | Panel Collection Eff. % |
|---|---|---|---|---|---|---|---|
| | | | .272 | 31.5 | .232 | .7 | 33.2 |
| | 10.30 | am | .48 | 23.5 | .306 | .735 | 41.6 |
| Vary | to | | .715 | 18 | .348 | .725 | 48 |
| | 2.30 | pm | .78 | 12.8 | .272 | .594 | 45.9 |
| Flow | | | .86 | 15.3 | .358 | .601 | 59.5 |
| | | | 1.22 | 13 | .429 | .692 | 62 |
| Rate | | | 1.46 | 9.4 | .37 | .615 | 60.1 |
| | | | 2.08 | 7.8 | .436 | .74 | 59 |
| | | | 3.45 | .7 | .438 | .734 | 59.6 |
| | 9.00 | am | ↑ | 6.4 | .168 | .43 | 39.2 |
| | 10.00 | am | ↑ | 10 | .288 | .484 | 59.5 |
| Const. | 10.30 | am | ↑ | 13.4 | .448 | .578 | 77.5 |
| | 11.30 | am | ↑ | 15.1 | .499 | .76 | 65.6 |
| Flow | 12.30 | pm | ↑ | 18.8 | .58 | .893 | 65 |
| | 1.00 | pm | 1.25 | 18.9 | .569 | .893 | 63.8 |
| Rate | 1.30 | pm | ↓ | 19.8 | .589 | .91 | 64.8 |
| | 2.00 | pm | ↓ | 18.9 | .562 | .834 | 67.5 |
| | 3.00 | pm | ↓ | 14.4 | .415 | .745 | 55.8 |
| | 3.50 | pm | ↓ | 10.2 | .301 | .625 | 45.2 |
| | 4.30 | pm | ↓ | 10.3 | .301 | .625 | 48.2 |

$E_c$ = Energy collected by water KJ/s or kW = m $C_P(T_2-T_1)$
$\dot{m}$ = Mass flow rate of water Kg/s
$C_P$ = Specific heat of water KJ/kg deg. C.
$T_2$ = Mean outlet water temperature °C.
$T_1$ = Mean inlet water temperature °C.
$I$ = Solar radiation KW/m²
$A$ = Effective absorption area of panel m²

$\eta$ = Panel collection efficiency = $\dfrac{E_c/A}{I}$

TABLE II

| Mass M | Time | Solar Radiation Kwh/m² | Solar Radiation MJ/m² | Temp. °C. | Temp. Rise °C. | Energy Accumul. MJ | Panel Accumul. Eff.% | Orientation |
|---|---|---|---|---|---|---|---|---|
| | 10.00 am | .532 | 1.916 | 25.6 | 6.7 | 1.13 | 38 | |
| | 11.00 am | .595 | 2.14 | 33.5 | 6.3 | 1.06 | 31 | South |

TABLE II-continued

| Mass M | Time | Solar Radiation Kwh/m² | MJ/m² | Temp. °C. | Temp. Rise °C. | Energy Accumul. MJ | Panel Accumul. Eff.% | Orientation |
|---|---|---|---|---|---|---|---|---|
|  | 12.00 | .745 | 2.68 | 38 | 5.2 | .875 | 21.1 | 25° East |
| 40 | 1.00 pm | .835 | 3.01 | 43.2 | 3.5 | .59 | 12.6 |  |
|  | 2.00 pm | .79 | 2.84 | 45.7 | 1.8 | .303 | 6.9 |  |
|  | 3.00 pm | .704 | 2.53 | 46.3 | −1.3 | −.22 |  |  |
|  | 3.30 pm | .274 | .985 | 42.3 | −2.7 | −.45 |  |  |
|  | 10.00 am | .522 | 1.88 | 25.4 | 7.7 | 1.29 | 40 |  |
|  | 11.00 am | .665 | 2.39 | 34.25 | 7.5 | 1.26 | 34 |  |
| 40 | 12.00 | .767 | 2.76 | 40.75 | 6.75 | 1.13 | 26.4 | Due |
|  | 1.00 pm | .806 | 2.9 | 46.3 | 4.75 | .8 | 17.8 | South |
|  | 2.00 pm | .704 | 2.53 | 49.4 | 1.5 | .252 | 6.45 |  |
|  | 3.00 pm | .63 | 2.27 | 50 | −1 | −.168 |  |  |
|  | 10.00 am | .533 | 1.92 | 24 | 5.2 | 1.75 | 58.5 |  |
|  | 11.00 am | .642 | 2.51 | 28.5 | 5.0 | 1.68 | 47 |  |
| 80 | 12.00 | .682 | 2.46 | 34 | 5.0 | 1.68 | 44.2 | Due |
|  | 1.00 pm | .691 | 2.49 | 37.6 | 3.3 | 1.11 | 28.7 | South |
|  | 2.00 pm | .705 | 2.54 | 40 | .7 | .236 | 6 |  |
|  | 3.00 pm | .619 | 2.23 | 41 | 1.2 | .405 | 11.7 |  |
|  | 4.00 pm | .247 | .89 | 42 | −.4 | −.134 |  |  |

$E_A$ = Energy accumulated in 1 hour KJ
M = Mass of water in collecting tank Kg
$C_P$ = Specific heat of water KJ/kg deg C
$\Delta T$ = Temperature rise of water in collecting tank in 1 hour°C.
$E_A = M C_P \Delta T$
$I_A$ = Average solar radiation in 1 hour KJ/m²
A = Effective absorption area of panel m2
$\eta_A$ = Panel accumulation efficiency measured over 1 hour $$\eta_A = \frac{E_A/A}{I_A}$$

MECHANICAL PERFORMANCE TESTS

The panels used to obtain the solar energy collection data were also subjected to mechanical loading tests in order to establish their performance under wind, snow and personnel loadings. The specimens used in these tests were assembled ridge to ridge at pitch angles of 30° and 40°, and were supported at their wall plates (19, FIG. 7). Each specimen panel measured 11 ft. 9 in. long overall by 3 ft. wide, and the length between ridge and wall plate was 10 ft. 6 in. Measurements of deflection were made at three symmetrically located points between ridge and wall plate. Each panel weighed 1.125 lb/ft².

1. WIND LOADING

The imposed load due to wind was calculated in accordance with the British Standard Code of Practice No. 3 (B.S.C.P.3), Chap. V, part 2, 1972, assuming a building whose wall height (to the eaves) lies between one and a half times and one half the span between wall plates. Two extreme conditions were simulated: horizontal wind at right angles to the ridge and parallel to it. A wind speed of 62.6 miles/hr (Beaufort Scale 10=full gale) was assumed. Upward deflection is regarded as negative. The results are given in Table III.

TABLE III (Values of deflection at each pressure relate to lower, middle, and upper gauge points, the latter appearing at the foot of each column).

|  | Pitch Angle 30° Pressure | Deflection | Pitch Angle 40° Pressure | Deflection |
|---|---|---|---|---|
|  | (N/m²) | (mm) | (N/m²) | (mm) |
| A. Wind at Right Angles |  |  |  |  |
|  |  | −10.1 |  | 4.9 |
| Windward pitch | −241 | −17.4 | 125 | 8.2 |
|  |  | −11.1 |  | 3.2 |
|  |  | −14.8 |  | −14.2 |
| Leeward pitch | −385 | −25.6 | −385 | −22.6 |
|  |  | −14.6 |  | −11.0 |
| B Wind parallel |  |  |  |  |
|  |  | −20.0 |  | −20.4 |

TABLE III-continued (Values of deflection at each pressure relate to lower, middle, and upper gauge points, the latter appearing at the foot of each column).

|  | Pitch Angle 30° Pressure | Deflection | Pitch Angle 40° Pressure | Deflection |
|---|---|---|---|---|
|  | (N/m²) | (mm) | (N/m²) | (mm) |
| Either pitch | −529 | −34.6 | −529 | −33.8 |
|  |  | −22.4 |  | −18.5 |

2. SNOW LOADING

The loading due to snow was simulated by a uniformly distributed vertical load of 750 N/m² applied by sandbags on each pitch. The results are given in Table IV.

TABLE IV

|  | Deflection (mm) | |
|---|---|---|
| Gauge point | 30° pitch | 40° pitch |
| lower | 21.3 | 17.3 |
| middle | 37.3 | 28.6 |
| upper | 24.3 | 15.6 |

3. PERSONNEL LOADING

A load of 900 N was concentrated on a square area of side 125 mm. on one pitch. This loading was superimposed on the snow load and the additional deflections were measured at the same gauge points. The results are as follows:

TABLE V

|  | Deflection (mm) (Additional to snow loading) | |
|---|---|---|
| Gauge point | 30° pitch | 40° pitch |
| lower | 14.0 | 11.6 |
| middle | 25.0 | 19.4 |
| upper | 12.8 | 9.0 |

4. IMPACT TESTS

An official certification organisation for the building industry in Great Britain known as the Agrement Board, of Waterhouse Street, Hemel Hempstead, Hertfordshire, England, issued in January 1974 a "Common Directive for the Assessment of Products in Glass Reinforced Polyesters for use in Buildings" (January 1974). Two types of test are described—a hard body test and a soft body test. The hard body test involves the dropping of a steel ball weighing 1 Kg. from a height of 1 m. onto the panel, and this test caused no observable damage to the panel.

Before pursuing the hard body test to the point where damage becomes observable, it was decided to carry out the soft body test. This involves the dropping of a bag weighing 50 Kg. from a height of 2 m. onto the panel, and this test caused slight local separation of laminae. The panel was then repaired by the use of 0.16 Kg of material, and it was decided to subject the repaired panel to renewed snow and personnel loading tests to determine what effects, if any, such repair might have had. These repeat loading tests were carried out on the single repaired panel in order to isolate its behaviour from the influence of the other panel to which it was originally joined at the ridge. In the repeat tests, the repaired panel was anchored at the wall plate at a pitch of 30° and supported at the ridge with freedom of horizontal movement. The snow load was the same, at 750 N/m$^2$ and the personnel load was of the same individual magnitude—900 N/m$^2$—but was applied separately from the snow loading. The difference in constraint at the ridge precludes a direct comparison with the original snow and personnel loading tests, but the repeat test values are a valid indication of the strength of the repaired panel, and hence have a significance in the overall evaluation of the performance of roofs according to the present invention under practical service conditions. The results are given in Table VI, deflections being measured, as before, normal to the plane of the panel.

TABLE VI

| Gauge point | Deflection (mm) | |
|---|---|---|
| | Snow | Personnel |
| lower | 10 | 4 |
| middle | 12 | 6 |
| upper | 7 | 5 |

5. EARTHQUAKE LOADING

In order to gauge the performance of a panel under earthquake conditions, a single test panel was rigidly supported at eaves and ridge at a pitch angle of 30° and a horizontal load of 200 N/m$^2$—equivalent to a gravitational acceleration of 33.8 m/sec$^2$ (i.e. about 3½ times normal gravity), assuming that the specific gravity of the material is 1.4—was applied. This value of acceleration is approximately 10 times that measured during the El Centro earthquake. The results are given in Table VII.

TABLE VII

| Gauge point | Deflection (mm) |
|---|---|
| lower | 2.3 |
| middle | 2.7 |
| upper | 2.0 |

No damage was observable, indicating the ability of a roof according to the present invention to withstand severe earthquake conditions.

6. WALL PLATE FLANGE

Each panel had a wall plate flange (19, FIG. 7) extending across its full width at about 1 ft. 9 in. from the eaves edge of the panel. The panel was inverted and clamped by its wall plate flange, the ridge 80 being also supported. The eaves end of the panel was then uniformly loaded to a value of 250 N/m$^2$ (50 lb/ft$^2$) to represent an up-wind which can occur in practice. No detrimental effect on the structure was observable.

7. CREEP TESTS

Two panels were assembled ridge to ridge as in the wind, snow and personnel loading tests 1-3 above at pitch angles of 30° and 40°. At each pitch angle, both panels were loaded at 673 N/m$^2$. The initial deflection was measured at each gauge point on each flank of the roof, and the load was left in situ for 24 hours. Each gauge on each flank was then read again, the load was removed, and the immediate recovery value noted. The latter was recorded in Table VIII as a mean value under "Unload—0 hrs." The rate of recovery beyond that point was comparable with the creep rate. The creep values are given in Table VIII.

TABLE VIII

| | Deflection (mm) | | | | | | | |
|---|---|---|---|---|---|---|---|---|
| | Pitch Angle 30° | | | | Pitch Angle 40° | | | |
| Time: Gauge point | 0 hrs | 24 hrs. | creep (diff) | Unload 0 hrs (mean) | 0 hrs | 24 hrs. | creep (diff) | Unload 0 hrs (mean) |
| Flank I | | | | | | | | |
| lower | 23.2 | 34.1 | 10.9 | | 21.2 | 28.1 | 6.9 | |
| middle | 40 | 58 | 18 | 3.2 | 35.5 | 47 | 11.5 | 3.0 |
| upper | 24.6 | 36.1 | 11.5 | | 18 | 24.5 | 6.5 | |
| Flank II | | | | | | | | |
| lower | 20.5 | 28.6 | 8.1 | | 19 | 23.5 | 4.5 | |
| middle | 37.1 | 50.5 | 13.4 | 3.2 | 30.5 | 38.5 | 8 | 3.0 |
| upper | 25.2 | 37.2 | 12 | | 19 | 23.5 | 4.5 | |

CONCLUSIONS

A solar heat collecting panel according to the present invention behaves mechanically in a generally linear fashion under particular load conditions. The result of the soft body impact test shows both that failure under excess load tends to be progressive rather than sudden—as with brittle materials—and that original strength can usually be restored by repair in situ. With reference to the Earthquake test, it is noteworthy that if the roof falls as a result of collapse of one or more walls, the absence of the conventional timber roof support structure consisting of rafters and purlins greatly reduces the impact on the interior. In addition, there is no risk of fragmentation comparable with dislodged tiles, and removal during rescue operations is easier.

I claim:

1. A solar heat collector for a building comprising a self-supporting laminar GRP panel including
   a substrate including longitudinal corrugations and having outer and under surfaces;
   a stiffening beam former located lengthwise of the substrate and upstanding on the under surface thereof; and
   a lamina of GRP overlying and coupled to said under surface and to said former;
   a fluid flow channel being defined between said substrate and said lamina.

2. A solar heat collector as claimed in claim 1 wherein said stiffening beam former is of Vee shape in cross-section and spans the distance between a pair of said corrugations.

3. A solar heat collector as claimed in claim 2 wherein said Vee-shaped former includes flanks and said corrugations define troughs and wherein the flanks of said Vee-shaped former blend smoothly into the troughs of adjacent of said corrugations, and wherein
   said substrate includes and said adjacent corrugations are separated by a substantially plane zone.

4. A solar heat collector as claimed in claim 3 wherein each of said corrugations includes and is subdivided lengthwise into a plurality of sections of substantially equal length;
   said substrate including transverse steps corresponding to said sections, said fluid flow channel being continuous across at least one step.

5. A solar heat collector as claimed in claim 4 wherein all said sections of all said corrugations taper substantially equally in the same direction.

6. A solar heat collector as claimed in claim 5 wherein the flanks of the Vee-shaped formers have intersections with the steps in the substrate and wherein each flank of a said Vee-shaped former includes and is offset by a gusset at each intersection of said flank with a step in said substrate so as to form a series of buttresses transverse to the line of said former.

7. A solar heat collector for the roof of a building, said roof having eaves and a ridge, said building including supporting walls, said collector comprising
   laminated GRP panels respectively having eaves and ridge ends and adapted to extend as self-supporting components between said eaves and ridge of said roof on opposite sides of said ridge;
   upstanding roof ridge flanges at said roof ends of said panels, said flanges being in mating engagement with each other;
   a depending wall plate flange on and adjacent said eaves end of said panel and adapted to engage one of said supporting walls of said building; and a stiffening beam extending substantially between said ridge flange and said wall plate flange,
   said laminated panel including laminae, a matrix of heat exchange fluid channels being defined between said laminae of said panel.

8. A pitched roof structure for a building including supporting walls and a roof including eaves and a ridge, said roof having oppositely inclined roof pitches having a slant height and meeting at said ridge, said structure comprising
   a plurality of laminated GRP load-bearing roof panels on opposite sides of said ridge and having upper and lower sides and being of a length equal to said slant height and each having an external surface finish on the upper side thereof simulating roofing tiles and including an integrally formed longitudinal stiffening beam on the under side thereof extending substantially from said eaves to said ridge;
   at least one of said roof panels including laminae and being provided with a heat-exchange fluid flow channel formed between said laminae;
   integral depending wall plate flanges on said panels to abut corresponding of the walls of the building, said roof panels resting on said walls;
   a substantially flat ceiling membrane spanning between the wall plate flanges on opposite sides of the roof, and
   means for reinforcing said ceiling membrane against buckling under compressive loading in a direction transverse to the roof ridge, and against sagging when said structure is in situ on the building.

9. A solar heat collector as claimed in claim 7 having a plurality of stiffening beams located symmetrically with respect to said roof panel and said matrix spans the area between adjacent beams.

10. A solar heat collector as claimed in claim 9 wherein a tensile element is anchored at each end adjacent the root of a beam and intermediate its ends is anchored to the crest of said beam.

11. A solar heat collector as claimed in claim 9 wherein each beam is a web of a rigid sheet material set on edge into the fabric of said panel.

12. A solar heat collector as claimed in claim 7 including a split capping tube adapted to embrace and grip the meeting ridge flanges of panels on opposite pitches of the roof.

13. A solar heat collector as claimed in claim 7 wherein a section of each ridge flange has a lip projecting over the ridge such that, when similar panels meet at the ridge their lips intercalate along the length of the roof ridge.

* * * * *